(12) United States Patent
Lee et al.

(10) Patent No.: US 12,368,845 B2
(45) Date of Patent: *Jul. 22, 2025

(54) INTRA PREDICTION-BASED VIDEO SIGNAL PROCESSING METHOD AND APPARATUS

(71) Applicant: Industry Academy Cooperation Foundation of Sejong University, Seoul (KR)

(72) Inventors: Yung-Lyul Lee, Seoul (KR); Nam Uk Kim, Seoul (KR); Jun Woo Choi, Seoul (KR)

(73) Assignee: INDUSTRY ACADEMY COOPERATION FOUNDATION OF SEJONG UNIVERSITY, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/582,065

(22) Filed: Jan. 24, 2022

(65) Prior Publication Data

US 2022/0150480 A1     May 12, 2022

Related U.S. Application Data

(63) Continuation of application No. 16/928,300, filed on Jul. 14, 2020, now Pat. No. 11,272,174, which is a
(Continued)

(30) Foreign Application Priority Data

Apr. 12, 2016   (KR) .................. 10-2016-0045020

(51) Int. Cl.
*H04N 19/11*  (2014.01)
*H04N 19/105*  (2014.01)
(Continued)

(52) U.S. Cl.
CPC ........... *H04N 19/11* (2014.11); *H04N 19/105* (2014.11); *H04N 19/117* (2014.11);
(Continued)

(58) Field of Classification Search
None
See application file for complete search history.

(56) References Cited

U.S. PATENT DOCUMENTS

2017/0048553 A1*   2/2017   Mukherjee ............. H04N 19/61

FOREIGN PATENT DOCUMENTS

CN    102484719 A    5/2012
CN    103597831 A    2/2014
(Continued)

OTHER PUBLICATIONS

Kim, Yong-Hwan et al., "High-Fidelity RGB Video Coding Using Adaptive Inter-Plane Weighted Prediction", *IEEE Transactions on Circuits and Systems for Video Technology*, vol. 19, Issue 7, 2009 (pp. 1-6).
(Continued)

*Primary Examiner* — Christopher Braniff
(74) *Attorney, Agent, or Firm* — NSIP Law

(57) ABSTRACT

According to the present invention, there is provided a method of decoding a video signal, the method including: determining an intra prediction mode of a current block; applying a filter to a first reference sample adjacent to the current block; obtaining a first prediction sample of the current block on the basis of the intra prediction mode and a second reference sample obtained by applying the filter; and obtaining a second prediction sample of the current block using the first prediction sample and the first reference sample.

3 Claims, 12 Drawing Sheets

Related U.S. Application Data continuation of application No. 16/093,310, filed as application No. PCT/KR2017/003247 on Mar. 27, 2017, now Pat. No. 10,757,406.

(51) Int. Cl.
*H04N 19/117* (2014.01)
*H04N 19/167* (2014.01)
*H04N 19/176* (2014.01)
*H04N 19/182* (2014.01)
*H04N 19/593* (2014.01)
*H04N 19/82* (2014.01)

(52) U.S. Cl.
CPC ......... *H04N 19/167* (2014.11); *H04N 19/176* (2014.11); *H04N 19/182* (2014.11); *H04N 19/593* (2014.11); *H04N 19/82* (2014.11)

(56) References Cited

FOREIGN PATENT DOCUMENTS

| | | |
|---|---|---|
| CN | 104967845 A | 10/2015 |
| JP | 3-295363 A | 12/1991 |
| KR | 10-2012-0065953 A | 6/2012 |
| KR | 10-2014-0057511 A | 5/2014 |
| KR | 10-2014-0064972 A | 5/2014 |
| KR | 10-2014-0066678 A | 6/2014 |
| KR | 10-2015-0038688 A | 4/2015 |
| KR | 10-2015-0140848 A | 12/2015 |
| WO | WO 2012/087034 A2 | 6/2012 |
| WO | WO 2012/148138 A2 | 11/2012 |
| WO | WO 2013/064094 A1 | 5/2013 |
| WO | WO 2013/069530 A1 | 5/2013 |

OTHER PUBLICATIONS

International Search report dated Jun. 15, 2017 in corresponding International Patent Application No. PCT/KR2017/003247 (5 pages in English and 5 pages in Korean).

\* cited by examiner

FIG. 4

| Q | A | B | C | D | E | F | G | H |
|---|---|---|---|---|---|---|---|---|
| I | a | b | c | d | | | | |
| J | e | f | g | h | | | | |
| K | i | j | k | l | | | | |
| L | m | n | o | p | | | | |
| M | | | | | | | | |
| N | | | | | | | | |
| O | | | | | | | | |
| P | | | | | | | | |

INTRA PREDICTION-BASED VIDEO SIGNAL PROCESSING METHOD AND APPARATUS

CROSS REFERENCE TO RELATED APPLICATIONS

This application is a continuation of U.S. application Ser. No. 16/928,300 filed on Jul. 14, 2020, which is a continuation of U.S. application Ser. No. 16/093,310 filed on Mar. 1, 2019, which is a U.S. National Stage Application of International Application No. PCT/KR2017/003247, filed on Mar. 27, 2017, which claims the benefit under 35 USC 119(a) and 365(b) of Korean Patent Application No. 10-2016-0045020, filed on Apr. 12, 2016, in the Korean Intellectual Property Office, the entire disclosures of which are incorporated herein by reference in their entirety.

TECHNICAL FIELD

The present invention relates to a video signal processing method and apparatus.

BACKGROUND ART

Recently, demands for high-resolution and high-quality images such as high definition (HD) images and ultra-high definition (UHD) images have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image compression techniques may be utilized.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; an entropy encoding technique of assigning a short code to a value with a high appearance frequency and assigning a long code to a value with a low appearance frequency; and the like. Image data may be effectively compressed by using such image compression technology, and may be transmitted or stored.

In the meantime, in addition to demands for high-resolution images, demands for stereographic image content, which is a new image service, have also increased. A video compression technique for effectively providing stereographic image content with high resolution and ultra-high resolution is being discussed.

DISCLOSURE

Technical Problem

The present invention is intended to propose a method and apparatus for rapid intra prediction coding, in encoding/decoding a video signal.

The present invention is intended to propose a method and apparatus for performing intra prediction based on a filter, in encoding/decoding a video signal.

The present invention is intended to enhance encoding/decoding efficiency by reducing errors between the original sample and a prediction sample, in encoding/decoding a video signal.

It is to be understood that technical problems to be solved by the present invention are not limited to the aforementioned technical problems and other technical problems which are not mentioned will be apparent from the following description to a person with an ordinary skill in the art to which the present invention pertains.

Technical Solution

According to the present invention, there is provided a method of decoding a video signal, the method including: determining an intra prediction mode of a current block; applying a filter to a first reference sample adjacent to the current block; obtaining a first prediction sample of the current block on the basis of the intra prediction mode and a second reference sample obtained by applying the filter; and obtaining a second prediction sample of the current block using the first prediction sample and the first reference sample.

In the method of decoding the video signal according to the present invention, the obtaining of the second prediction sample may include: determining a weighting value on the basis of a distance between the first prediction sample and the first reference sample; and obtaining the second prediction sample by performing bi-linear interpolation of the first prediction sample and the first reference sample on the basis of the weighting value.

In the method of decoding the video signal according to the present invention, the weighting value may be obtained by using at least one among at least one top reference sample positioned on a top of the current block and at least one left reference sample positioned on a left of the current block.

In the method of decoding the video signal according to the present invention, the first reference sample may include at least one among a top reference sample having the same x coordinate as the first prediction sample and a left reference sample having the same y coordinate as the first prediction sample.

In the method of decoding the video signal according to the present invention, the second reference sample may be obtained by applying a smoothing filter or by applying the smoothing filter and a bi-linear interpolation filter, to the first reference sample.

In the method of decoding the video signal according to the present invention, a length of the smoothing filter may be determined on the basis of at least one among the intra prediction mode of the current block and a size of the current block.

In the method of decoding the video signal according to the present invention, the bi-linear interpolation filter may operate on the basis of bi-linear interpolation between a value before the smoothing filter is applied to the first reference sample and a value after the smoothing filter is applied to the first reference sample.

In the method of decoding the video signal according to the present invention, a weighting value to be applied to a value before the smoothing filter is applied to the first reference sample and to a value after the smoothing filter is applied to the first reference sample may be determined on the basis of at least one among the intra prediction mode of the current block and a size of the current block.

According to the present invention, there is provided an apparatus for decoding a video signal, the apparatus including an intra prediction module configured to: determine an intra prediction mode of a current block; apply a filter to a first reference sample adjacent to the current block; obtain a first prediction sample of the current block on the basis of the intra prediction mode and a second reference sample obtained by applying the filter; and obtain a second prediction sample of the current block using the first prediction sample and the first reference sample.

It is to be understood that the foregoing summarized features are exemplary aspects of the following detailed description of the present invention without limiting the scope of the present invention.

Advantageous Effects

According to the present invention, rapid intra prediction encoding/decoding is possible on the basis of the transform coefficient.

According to the present invention, intra prediction is efficiently performed on the basis of the filter.

According to the present invention, encoding/decoding efficiency is enhanced by reducing errors between the original sample and the prediction sample.

Effects that may be obtained from the present invention will not be limited to only the above described effects. In addition, other effects which are not described herein will become apparent to those skilled in the art from the following description.

DESCRIPTION OF DRAWINGS

FIG. 4 is a diagram illustrating an example of reference pixels used in intra prediction.

FIG. 12 is a diagram illustrating an example of deriving a weighting value used in applying a filter to a prediction sample.

MODE FOR INVENTION

Figure 1:
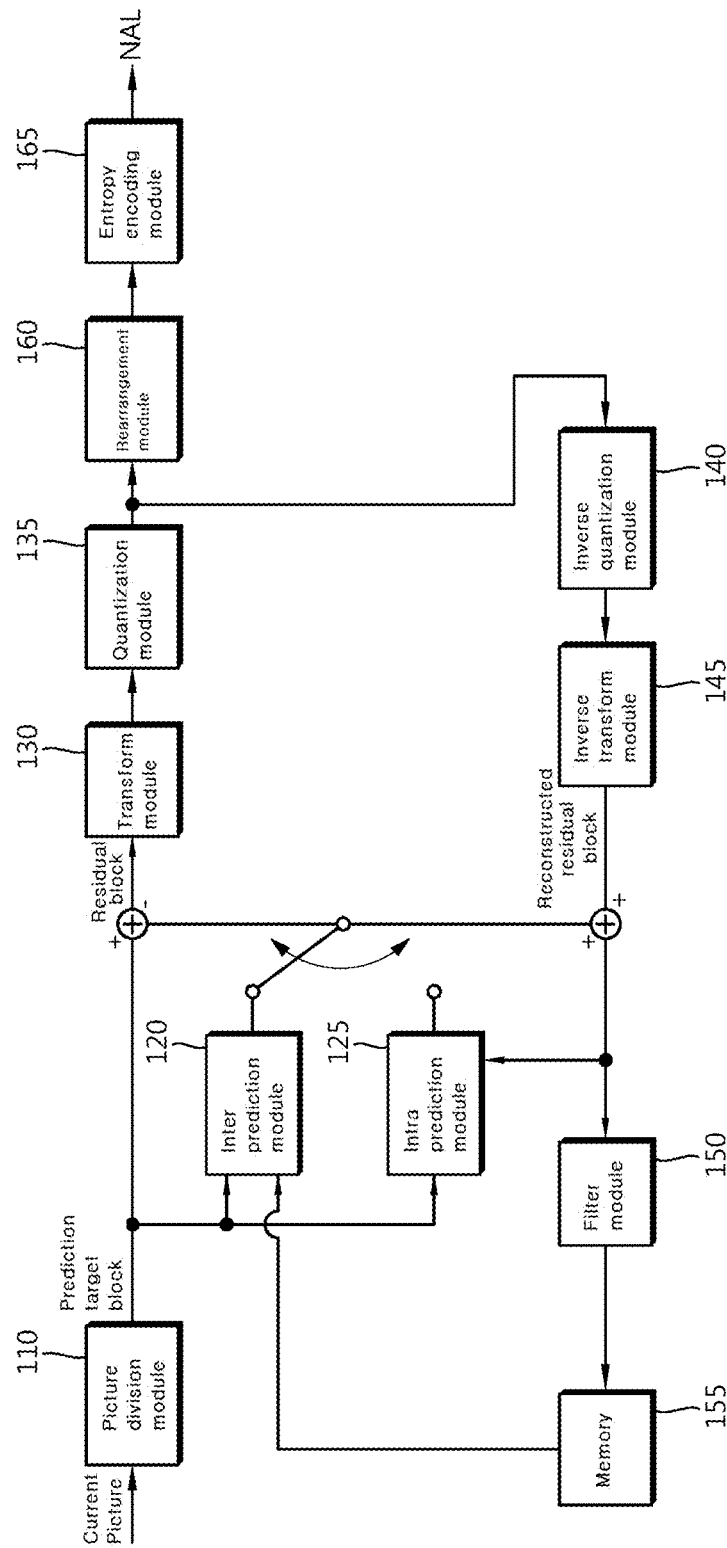
FIG. 1 is a block diagram illustrating an apparatus for encoding an image according to an embodiment of the present invention.

A variety of modifications may be made to the present invention and there are various embodiments of the present invention, examples of which will now be provided with reference to drawings and described in detail. However, the present invention is not limited thereto, and the exemplary embodiments can be construed as including all modifications, equivalents, or substitutes in a technical concept and a technical scope of the present invention. The similar reference numerals refer to the similar element in described the drawings.

Terms used in the specification, "first", "second", etc. can be used to describe various elements, but the elements are not to be construed as being limited to the terms. The terms are only used to differentiate one element from other elements. For example, the "first" element may be named the "second" element without departing from the scope of the present invention, and the "second" element may also be similarly named the "first" element. The term "and/or" includes a combination of a plurality of items or any one of a plurality of terms.

It will be understood that when an element is simply referred to as being "connected to" or "coupled to" another element without being "directly connected to" or "directly coupled to" another element in the present description, it may be "directly connected to" or "directly coupled to" another element or be connected to or coupled to another element, having the other element intervening therebetween. In contrast, it should be understood that when an element is referred to as being "directly coupled" or "directly connected" to another element, there are no intervening elements present.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

Hereinafter, preferred embodiments of the present invention will be described in detail with reference to the accompanying drawings. Hereinafter, the same elements in the drawings are denoted by the same reference numerals, and a repeated description of the same elements will be omitted.

FIG. 1 is a block diagram illustrating an apparatus for encoding an image according to an embodiment of the present invention.

Referring to FIG. 1, an apparatus 100 for encoding an image may include a picture division module 110, prediction modules 120 and 125, a transform module 130, a quantization module 135, a rearrangement module 160, an entropy encoding module 165, an inverse quantization module 140, an inverse transform module 145, a filter module 150, and a memory 155.

The constituents shown in FIG. 1 are independently shown so as to represent characteristic functions different from each other in the apparatus for encoding the image. Thus, it does not mean that each constituent is constituted in a constituent unit of separated hardware or software. In other words, each constituent includes each of enumerated constituents for convenience. Thus, at least two constituents of each constituent may be combined to form one constituent or one constituent may be divided into a plurality of constituents to perform each function. The embodiment where each constituent is combined and the embodiment where one constituent is divided are also included in the scope of the present invention, if not departing from the essence of the present invention.

Also, some of constituents may not be indispensable constituents performing essential functions of the present invention but be selective constituents improving only performance thereof. The present invention may be implemented by including only the indispensable constituents for implementing the essence of the present invention except the constituents used in improving performance. The structure including only the indispensable constituents except the selective constituents used in improving only performance is also included in the scope of the present invention.

The picture division module 110 may divide an input picture into one or more processing units. Here, the processing unit may be a prediction unit (PU), a transform unit (TU), or a coding unit (CU). The picture division module 110 may divide one picture into combinations of multiple coding units, prediction units, and transform units, and may encode a picture by selecting one combination of coding units, prediction units, and transform units with a predetermined criterion (for example, cost function).

For example, one picture may be divided into multiple coding units. A recursive tree structure, such as a quad tree structure, may be used to divide a picture into coding units. A coding unit which is divided into other coding units with one image or a largest coding unit as a root may be divided with child nodes corresponding to the number of divided coding units. A coding unit which is no longer divided according to a predetermined limitation serves as a leaf node. That is, when it is assumed that only square dividing is possible for one coding unit, one coding unit is divided into four other coding units at most.

Hereinafter, in the embodiment of the present invention, the coding unit may mean a unit of performing encoding or a unit of performing decoding.

One or more prediction units in the same size square shape or rectangular shape may be obtained by dividing a single coding unit. Alternatively, a single coding unit may be divided into prediction units in such a manner that one prediction unit may be different from another prediction unit in shape and/or size.

When a prediction unit subjected to intra prediction based on a coding unit is generated and the coding unit is not the smallest coding unit, intra prediction is performed without division into multiple prediction units N×N.

The prediction modules 120 and 125 may include an inter prediction module 120 performing inter prediction and an intra prediction module 125 performing intra prediction. Whether to perform inter prediction or intra prediction for the prediction may be determined, and detailed information (for example, an intra prediction mode, a motion vector, a reference picture, and the like) according to each prediction method may be determined. Here, the processing unit subjected to prediction may be different from the processing unit in which the prediction method and the detailed content are determined. For example, the prediction method, the prediction mode, and the like may be determined by the prediction unit, and prediction may be performed by the transform unit. A residual value (residual block) between the generated prediction block and an original block may be input to the transform module 130. Also, prediction mode information used for prediction, motion vector information, and the like may be encoded with the residual value by the entropy encoding module 165 and may be transmitted to an apparatus for decoding. When a particular encoding mode is used, the original block is intactly encoded and transmitted to a decoding module without generating the prediction block by the prediction modules 120 and 125.

The inter prediction module 120 may predict the prediction unit on the basis of information on at least one among a previous picture and a subsequent picture of the current picture, or in some cases may predict the prediction unit on the basis of information on some encoded regions in the current picture. The inter prediction module 120 may include a reference picture interpolation module, a motion prediction module, and a motion compensation module.

The reference picture interpolation module may receive reference picture information from the memory 155 and may generate pixel information of an integer pixel or less from the reference picture. In the case of luma pixels, an 8-tap DCT-based interpolation filter having different coefficients may be used to generate pixel information on an integer pixel or less on a per-¼ pixel basis. In the case of chroma signals, a 4-tap DCT-based interpolation filter having different filter coefficients may be used to generate pixel information on an integer pixel or less on a per-⅛ pixel basis.

The motion prediction module may perform motion prediction based on the reference picture interpolated by the reference picture interpolation module. As methods for calculating a motion vector, various methods, such as a full search-based block matching algorithm (FBMA), a three step search (TSS) algorithm, a new three-step search (NTS) algorithm, and the like may be used. The motion vector may have a motion vector value on a per-½ or -¼ pixel basis on the basis of the interpolated pixel. The motion prediction module may predict a current prediction unit by changing the motion prediction method. As motion prediction methods, various methods, such as a skip method, a merge method, an advanced motion vector prediction (AMVP) method, an intra block copy method, and the like may be used.

The intra prediction module 125 may generate a prediction unit on the basis of reference pixel information around a current block, which is pixel information in the current picture. When the nearby block of the current prediction unit is a block subjected to inter prediction and thus a reference pixel is a pixel subjected to inter prediction, reference pixel information of a nearby block subjected to intra prediction is used instead of the reference pixel included in the block subjected to inter prediction. That is, when a reference pixel is unavailable, at least one reference pixel of available reference pixels is used instead of unavailable reference pixel information.

Prediction modes in intra prediction may include a directional prediction mode using reference pixel information depending on a prediction direction and a non-directional mode not using directional information in performing prediction. The number of directional prediction modes may be equal to or greater than 33 defined in the HEVC standard, and for example, may extend to the number ranging 60 to 70. A mode for predicting luma information may be different from a mode for predicting chroma information, and in order to predict the chroma information, intra prediction mode information used to predict the luma information or predicted luma signal information may be utilized.

In performing intra prediction, when the prediction unit is the same as the transform unit in size, intra prediction is performed on the prediction unit on the basis of the pixels positioned at the left, the top left, and the top of the prediction unit. However, in performing intra prediction, when the prediction unit is different from the transform unit in size, intra prediction is performed using a reference pixel based on the transform unit. Also, intra prediction using N×N division only for the smallest coding unit may be used.

In the intra prediction method, a prediction block may be generated after applying an adaptive intra smoothing (AIS) filter to a reference pixel depending on the prediction modes. The type of AIS filter applied to the reference pixel may vary. In order to perform the intra prediction method, an intra prediction mode of the current prediction unit may be predicted from the intra prediction mode of the prediction unit around the current prediction unit. In predicting the prediction mode of the current prediction unit by using mode information predicted from the nearby prediction unit, when the intra prediction mode of the current prediction unit is the same as the intra prediction mode of the nearby prediction unit, information indicating that the current prediction unit and the nearby prediction unit have the same prediction mode is transmitted using predetermined flag information. When the prediction mode of the current prediction unit is different from the prediction mode of the nearby prediction unit, entropy encoding is performed to encode prediction mode information of the current block.

Also, a residual block may be generated on the basis of prediction units generated by the prediction modules 120 and 125, wherein the residual block includes information on a residual value which is a difference value between the prediction unit subjected to prediction and the original block of the prediction unit. The generated residual block may be input to the transform module 130.

The transform module 130 may transform the residual block, which includes the information on the residual value between the original block and the prediction units generated by the prediction modules 120 and 125, by using a transform method, such as discrete cosine transform (DCT), discrete sine transform (DST), and KLT. Whether to apply DCT, DST, or KLT in order to transform the residual block may be determined on the basis of intra prediction mode information of the prediction unit which is used to generate the residual block.

The quantization module 135 may quantize values transformed into a frequency domain by the transform module 130. Quantization coefficients may vary according to a block or importance of an image. The values calculated by the quantization module 135 may be provided to the inverse quantization module 140 and the rearrangement module 160.

The rearrangement module 160 may perform rearrangement of coefficient values with respect to quantized residual values.

The rearrangement module 160 may change a coefficient in the form of a two-dimensional block into a coefficient in the form of a one-dimensional vector through a coefficient scanning method. For example, the rearrangement module 160 may scan from a DC coefficient to a coefficient in a high frequency domain using a zigzag scanning method so as to change the coefficients to be in the form of a one-dimensional vector. Depending on the size of the transform unit and the intra prediction mode, vertical direction scanning where coefficients in the form of two-dimensional block are scanned in the column direction or horizontal direction scanning where coefficients in the form of two-dimensional block are scanned in the row direction may be used instead of zigzag scanning. That is, which scanning method among zigzag scanning, vertical direction scanning, and horizontal direction scanning is used may be determined depending on the size of the transform unit and the intra prediction mode.

The entropy encoding module 165 may perform entropy encoding based on the values calculated by the rearrangement module 160. Entropy encoding may use various encoding methods, for example, exponential Golomb coding, context-adaptive variable length coding (CAVLC), and context-adaptive binary arithmetic coding (CABAC).

The entropy encoding module 165 may encode a variety of information, such as residual value coefficient information and block type information of the coding unit, prediction mode information, division unit information, prediction unit information, transmission unit information, motion vector information, reference frame information, block interpolation information, filtering information, and the like from the rearrangement module 160 and the prediction modules 120 and 125.

The entropy encoding module 165 may entropy encode the coefficient values of the coding unit input from the rearrangement module 160.

The inverse quantization module 140 may inversely quantize the values quantized by the quantization module 135 and the inverse transform module 145 may inversely transform the values transformed by the transform module 130. The residual value generated by the inverse quantization module 140 and the inverse transform module 145 may be combined with the prediction unit predicted by a motion estimation module, a motion compensation unit, and the intra prediction module of the prediction modules 120 and 125 such that a reconstructed block can be generated.

The filter module 150 may include at least one of a deblocking filter, an offset correction module, and an adaptive loop filter (ALF).

The deblocking filter may remove block distortion that occurs due to boundaries between the blocks in the reconstructed picture. In order to determine whether to perform deblocking, whether to apply the deblocking filter to the current block may be determined on the basis of the pixels included in several rows and columns in the block. When the deblocking filter is applied to the block, a strong filter or a weak filter is applied depending on required deblocking filtering intensity. Also, in applying the deblocking filter, when performing horizontal direction filtering and vertical direction filtering, horizontal direction filtering and vertical direction filtering are configured to be processed in parallel.

The offset correction module may correct an offset from the original image on a per-pixel basis with respect to the image subjected to deblocking. In order to perform offset correction on a particular picture, used is a method of separating pixels of the image into the predetermined number of regions, determining a region to be subjected to offset, and applying the offset to the determined region or a method of applying an offset in consideration of edge information of each pixel.

Adaptive loop filtering (ALF) may be performed on the basis of the value obtained by comparing the filtered reconstruction image and the original image. The pixels included in the image may be divided into predetermined groups, a filter to be applied to each of the groups may be determined, and filtering may be individually performed on each group. Information on whether to apply ALF and a luma signal may be transmitted for each coding unit (CU). The form and filter coefficient of a filter for ALF to be applied may vary according to each block. Also, the filter for ALF in the same form (fixed form) may be applied regardless of the characteristic of the application target block.

The memory 155 may store the reconstruction block of the picture calculated through the filter module 150. The stored reconstruction block or picture may be provided to the prediction modules 120 and 125 in performing inter prediction.

Figure 2:
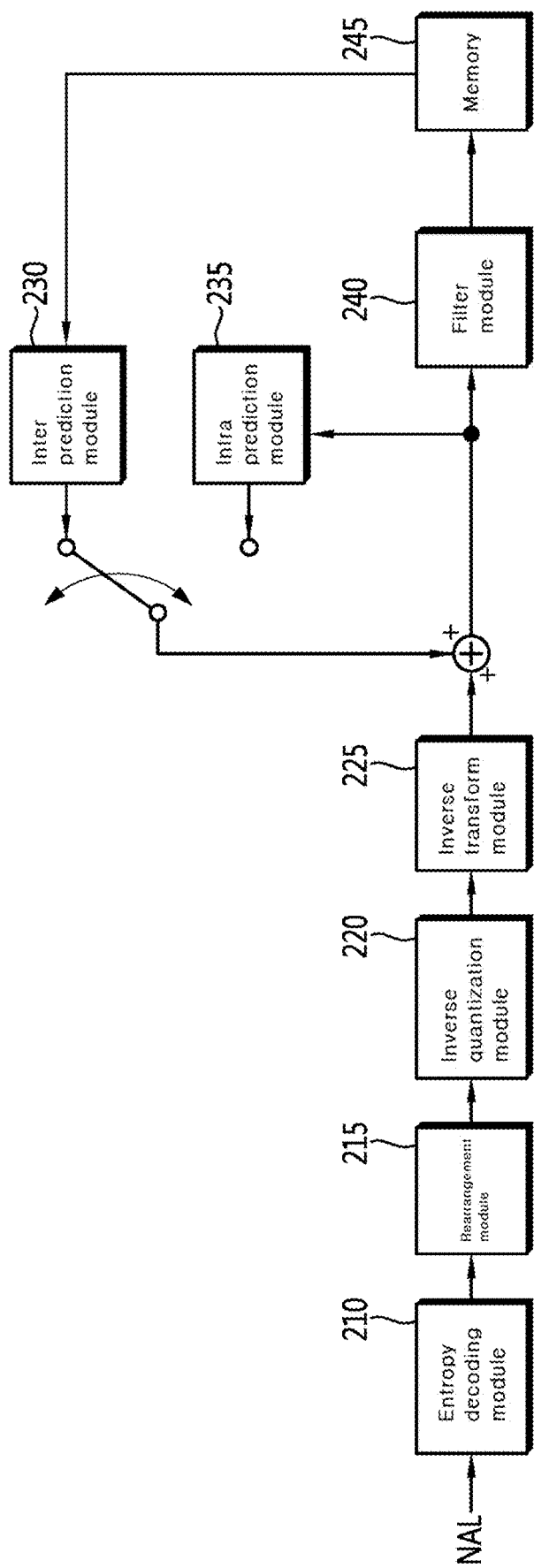
FIG. 2 is a block diagram illustrating an apparatus for decoding an image according to an embodiment of the present invention.

FIG. 2 is a block diagram illustrating an apparatus for decoding an image according to an embodiment of the present invention.

Referring to FIG. 2, an apparatus 200 for decoding an image may include an entropy decoding module 210, a rearrangement module 215, an inverse quantization module 220, an inverse transform module 225, prediction modules 230 and 235, a filter module 240, and a memory 245.

When an image bitstream is input from the apparatus for encoding the image, the input bitstream is decoded according to an inverse process of the apparatus for encoding the image.

The entropy decoding module 210 may perform entropy decoding according to the inverse process of the entropy encoding by the entropy encoding module of the apparatus for encoding the image. For example, corresponding to the methods performed by the apparatus for encoding the image, various methods, such as exponential Golomb coding, context-adaptive variable length coding (CAVLC), and context-adaptive binary arithmetic coding (CABAC) may be applied.

The entropy decoding module 210 may decode information on intra prediction and inter prediction performed by the apparatus for encoding.

The rearrangement module 215 may perform rearrangement on the bitstream entropy decoded by the entropy decoding module 210 on the basis of the rearrangement method used in the apparatus for encoding. The coefficients expressed in the form of the one-dimensional vector may be reconstructed and rearranged into the coefficients in the form of the two-dimensional block. The rearrangement module 215 may perform rearrangement through a method of receiving information related to coefficient scanning performed in the apparatus for encoding and of inversely scanning on the basis of the scanning order performed in the apparatus for encoding.

The inverse quantization module 220 may perform inverse quantization on the basis of a quantization parameter received from the apparatus for encoding and the rearranged coefficient values of the block.

The inverse transform module 225 may perform, on the quantization result obtained by the apparatus for encoding the image, inverse quantization, namely, inverse DCT, inverse DST, and inverse KLT that are the inverse of transform, which is DCT, DST, and KLT, performed by the transform module. Inverse transform may be performed on the basis of a transmission unit determined by the apparatus for encoding the image. The inverse transform module 225 of the apparatus for decoding the image may selectively perform transform techniques (for example, DCT, DST, and KLT) depending on multiple pieces of information, such as the prediction method, the size of the current block, the prediction direction, and the like.

The prediction modules 230 and 235 may generate a prediction block on the basis of information on prediction block generation received from the entropy decoding module 210 and information on a previously decoded block or picture received from the memory 245.

As described above, like operation of the apparatus for encoding the image, in performing intra prediction, when the prediction unit is the same as the transform unit in size, intra prediction is performed on the prediction unit on the basis of the pixels positioned at the left, the top left, and the top of the prediction unit. However, in performing intra prediction, when the prediction unit is different from the transform unit in size, intra prediction is performed using a reference pixel based on the transform unit. Also, intra prediction using N×N division only for the smallest coding unit may be used.

The prediction modules 230 and 235 may include a prediction unit determination module, an inter prediction module, and an intra prediction module. The prediction unit determination module may receive a variety of information, such as prediction unit information, prediction mode information of an intra prediction method, information on motion prediction of an inter prediction method, and the like from the entropy decoding module 210, may separate a prediction unit in a current coding unit, and may determine whether inter prediction or intra prediction is performed on the prediction unit. By using information required in inter prediction of the current prediction unit received from the apparatus for encoding the image, the inter prediction module 230 may perform inter prediction on the current prediction unit on the basis of information on at least one among a previous picture and a subsequent picture of the current picture including the current prediction unit. Alternatively, inter prediction may be performed on the basis of information on some pre-reconstructed regions in the current picture including the current prediction unit.

In order to perform inter prediction, it may be determined which of a skip mode, a merge mode, and an AMVP mode is used as the motion prediction method of the prediction unit included in the coding unit, on the basis of the coding unit.

The intra prediction module 235 may generate a prediction block on the basis of pixel information in the current picture. When the prediction unit is a prediction unit subjected to intra prediction, intra prediction is performed on the basis of intra prediction mode information of the prediction unit received from the apparatus for encoding the image. The intra prediction module 235 may include an adaptive intra smoothing (AIS) filter, a reference pixel interpolation module, and a DC filter. The AIS filter performs filtering on the reference pixel of the current block, and whether to apply the filter may be determined depending on the prediction mode of the current prediction unit. The prediction mode of the prediction unit received from the apparatus for encoding the image and AIS filter information are used in performing AIS filtering on the reference pixel of the current block. When the prediction mode of the current block is a mode in which AIS filtering is not performed, the AIS filter is not applied.

When the prediction mode of the prediction unit is a prediction mode in which intra prediction is performed on the basis of the pixel value obtained by interpolating the reference pixel, the reference pixel interpolation module may interpolate the reference pixel to generate the reference pixel in units of a pixel of an integer value or less. When the prediction mode of the current prediction unit is a prediction mode in which a prediction block is generated without interpolating the reference pixel, the reference pixel is not interpolated. The DC filter may generate a prediction block through filtering when the prediction mode of the current block is a DC mode.

The reconstructed block or picture may be provided to the filter module 240. The filter module 240 may include the deblocking filter, the offset correction module, and the ALF.

From the apparatus for encoding the image, received is information on whether the deblocking filter is applied to the relevant block or picture and information on whether the strong filter or the weak filter is applied when the deblocking filter is applied. The deblocking filter of the apparatus for decoding the image may receive information on the deblocking filter from the apparatus for encoding the image, and the apparatus for decoding the image may perform deblocking filtering on the relevant block.

The offset correction module may perform offset correction on the reconstructed image on the basis of the type of offset correction, offset value information, and the like applied to the image in performing encoding.

The ALF may be applied to the coding unit on the basis of information on whether to apply the ALF, ALF coefficient information, and the like received from the apparatus for encoding. The ALF information may be provided as being included in a particular parameter set.

The memory 245 may store the reconstructed picture or block for use as a reference picture or a reference block, and may provide the reconstructed picture to an output module.

As described above, hereinafter, in the embodiment of the present invention, for convenience of description, the coding unit is used as a term representing encoding unit, but the coding unit may serve as a unit performing decoding as well as encoding.

Figure 3:
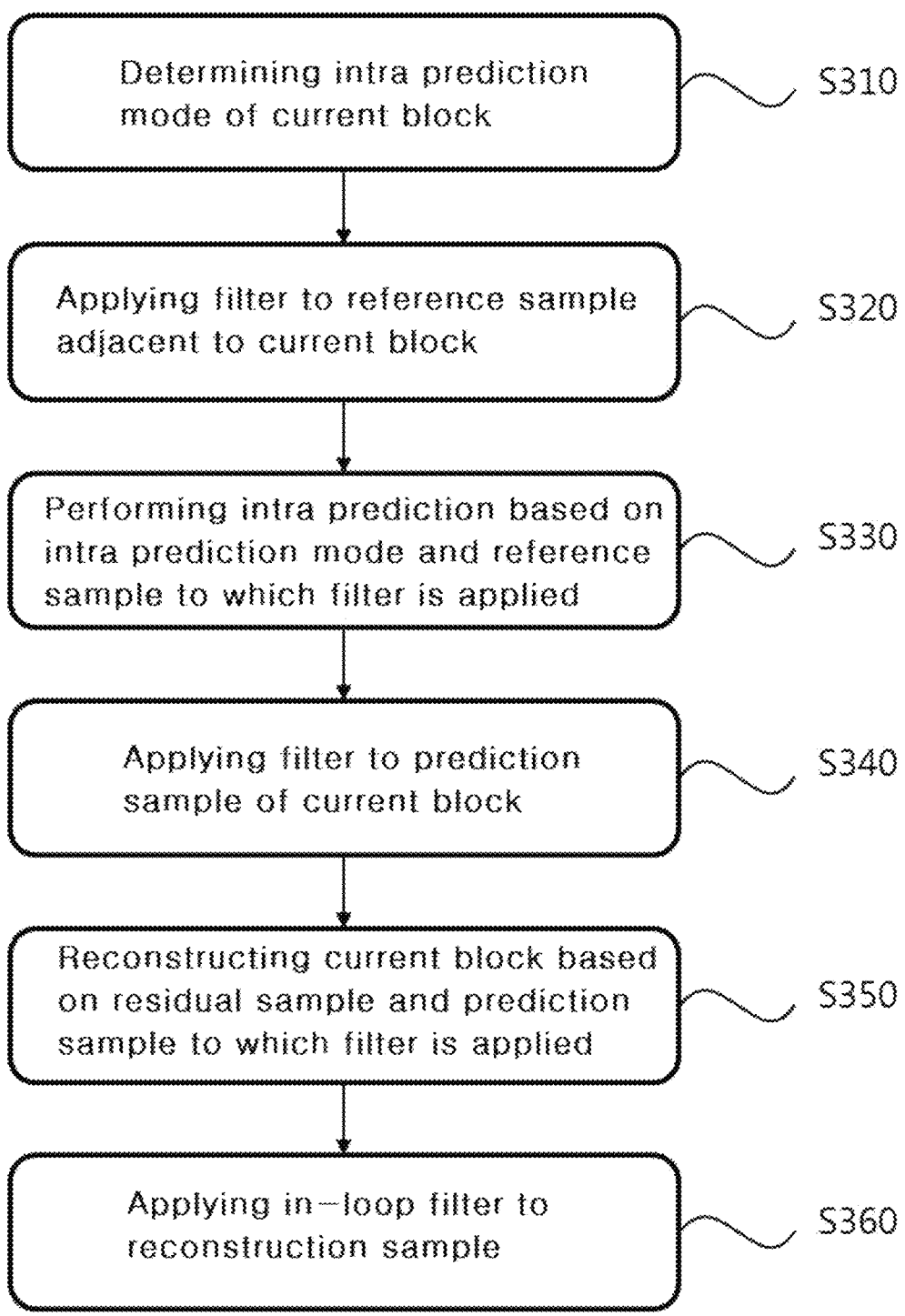
FIG. 3 is a diagram illustrating a method of decoding an image on the basis of intra prediction according to an embodiment of the present invention.

FIG. 3 is a diagram illustrating a method of decoding an image on the basis of intra prediction according to an embodiment of the present invention.

Hereinafter, for convenience of description, embodiments will be described based on 35 intra prediction modes defined in HEVC. However, even when 35 or more intra prediction modes (namely, extended intra prediction modes) are used, the present invention is equally applicable. In the following embodiments, the point of the smallest unit constituting the image is referred to as a pixel, a sample, or the like.

Referring to FIG. 3, when the current block is a block encoded in the intra mode, the intra prediction mode of the current block is determined at step S310.

The intra prediction mode of the current block may be determined with reference to the intra prediction mode of the nearby block adjacent to the current block. For example, in order to determine the intra prediction mode of the current block, the intra prediction mode of the nearby block close to the current block is referenced such that a candidate mode list is generated. Next, on the basis of an index (for example, a most probable mode (MPM) index) indicating one of the intra prediction modes included in the candidate mode list, the intra prediction mode of the current block may be determined, or the intra prediction mode which is not included in the candidate mode list may be determined as the intra prediction mode of the current block.

The current block may correspond to a prediction block in a square shape, such as 4×4, 8×8, 16×16, 32×32, and the like. There are multiple intra prediction mode candidates according to the size of the current block. One of the intra prediction mode candidates may be derived as the intra prediction mode of the current block. Here, the number of intra prediction mode candidates may be a fixed constant or may be a variable varying with the size of the current block.

When the intra prediction mode of the current block is determined, the filter is applied to the reference pixel adjacent to the current block at step S320. Here, at least one pixel included in the nearby block adjacent to the current block may be used as the reference pixel for intra prediction of the current block. That is, a reconstruction value of the nearby block adjacent to the current block may be used in intra prediction of the current block. The nearby block may include at least one among the blocks adjacent to the bottom left, the left, the top left, the top, the top right, and the bottom of the current block.

Figure 4:
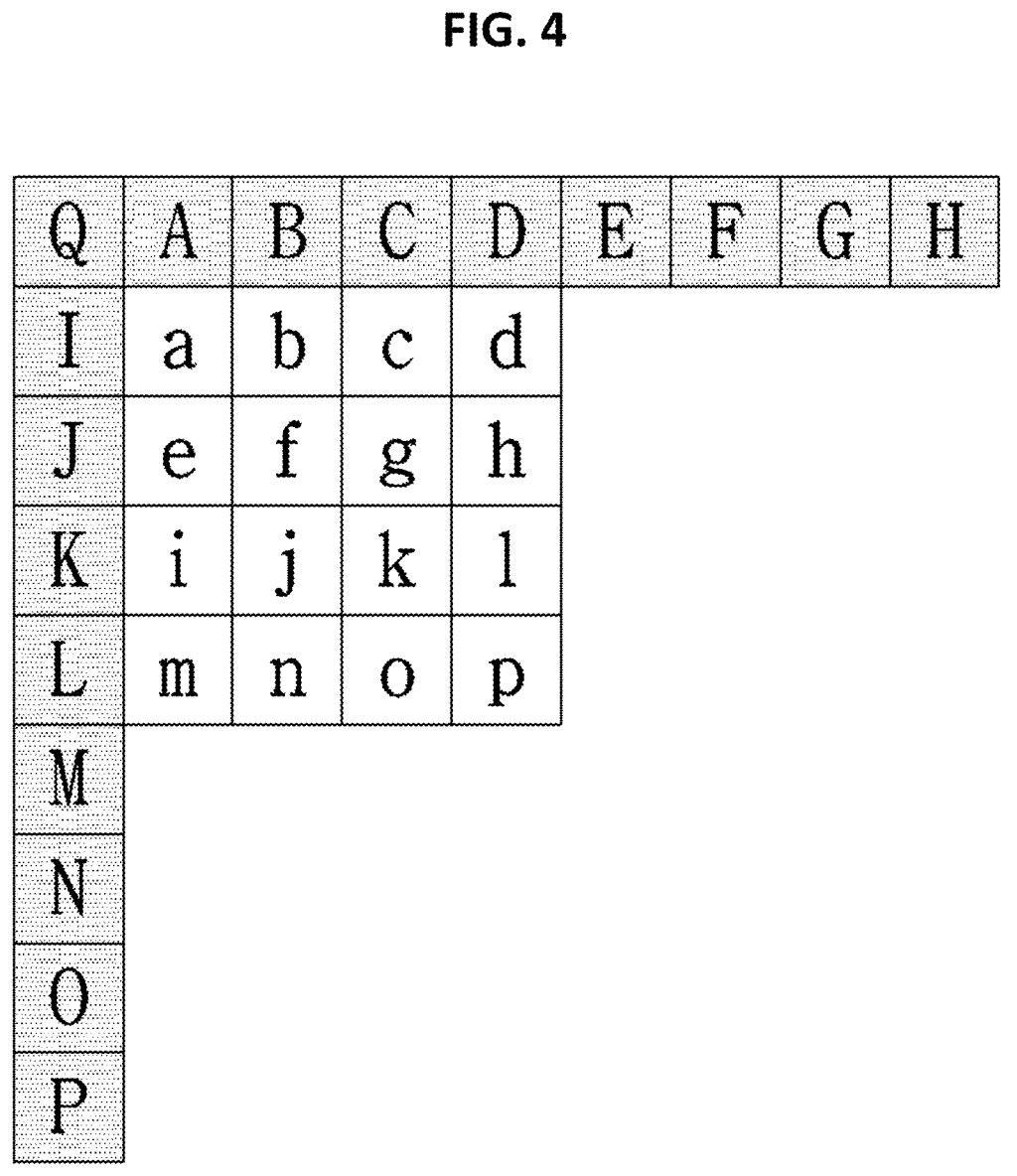

For example, FIG. 4 is a diagram illustrating an example of reference pixels used in intra prediction. Assuming that the current block is N×N in size, 2N or more reference samples positioned on the top of the current block and 2N or more reference samples positioned on the left of the current block may be used in intra prediction of the current block. Accordingly, when the current block is a 4×4-sized prediction block (or transform block), as the example shown in FIG. 4, the top reference samples A to H, and Q positioned on the top of the current block and the left reference samples I to P, and Q positioned on the left of the current block are used in intra prediction of the current block.

In the following embodiments, the reference sample positioned on the top of the current block is referred to as the top reference sample, and the reference sample positioned on the left of the current block is referred to as the left reference sample. Moreover, the reference sample (namely, the reference sample with coordinates (−1, −1)) which is both the top reference sample and the left reference sample is referred to as the top left reference sample.

On the basis of at least one among the size, the intra prediction mode of the current block, and the position of the reference sample, filtering is performed on the reference sample. The current block may mean the coding block, the prediction block, or the transform block. Specifically, by taking at least one among the width/height of the current block and prediction directionality according to the intra prediction mode into consideration, it is possible to determine at least one among whether to perform filtering on the reference sample, intensity of filtering, the filter length, and the filter coefficient. Intensity of filtering may indicate whether intensity of the filter applied to the reference sample is strong or weak, and this may be expressed in the form of flag. In filtering of the present invention, one of multiple filters of which filter lengths or filter coefficients or both are different from each other may be selectively used. Here, it is possible to further take whether the reference sample is positioned on the left, the top, or the corner of the current block, and the like into consideration. The embodiment in which the filter is applied to the reference sample will be described with reference to FIGS. 5 and 8.

When the reference pixel adjacent to the current block is unavailable, information on the unavailable reference pixel is substituted by information on available reference pixel. Here, information on the reference pixel may include the pixel value of the reference pixel. Availability of the reference pixel may be determined on the basis of whether the nearby block including the reference pixel is decoded before the current block, whether the nearby block including the reference pixel is a block encoded in the inter mode, whether the reference pixel is included in the same slice or tile as the current block, and the like.

Intra prediction may be performed on the basis of the reference sample adjacent to the current block at step S330. According to the intra prediction mode of the current block, the position of the reference sample may be determined, and on the basis of the determined reference sample, the prediction sample of the current block may be derived.

When the prediction sample of the current block is obtained through intra prediction, the filter is applied to the prediction sample at step S340. Whether to apply the filter to the prediction sample filter may be determined according to the size, the intra prediction mode of the current block, and the like. The embodiment in which the filter is applied to the prediction sample will be described with reference to FIG. 10.

When the filter is applied to the prediction sample, a reconstruction sample of the current block is derived on the basis of the prediction sample to which the filter is applied and the residual sample corresponding thereto at step S350.

The residual sample may be derived by selectively performing at least one among inverse quantization and inverse transform on the transform coefficient (or the residual coefficient) of the current block obtained from the bitstream. Here, as transform types for inverse transform, DCT, DST, KLT, and the like may be used. Here, one of the transform types may be selectively used considering the prediction mode of the current block, the size of the current block (for example, the PU and the TU), the luma/chroma component, and the like.

An in-loop filter may be applied to the reconstruction sample derived by adding the prediction sample and the residual sample at step S360. The in-loop filter may include at least one of the deblocking filter, a sample adaptive offset (SAO) filter, and an adaptive loop filter (ALF).

Figure 5:
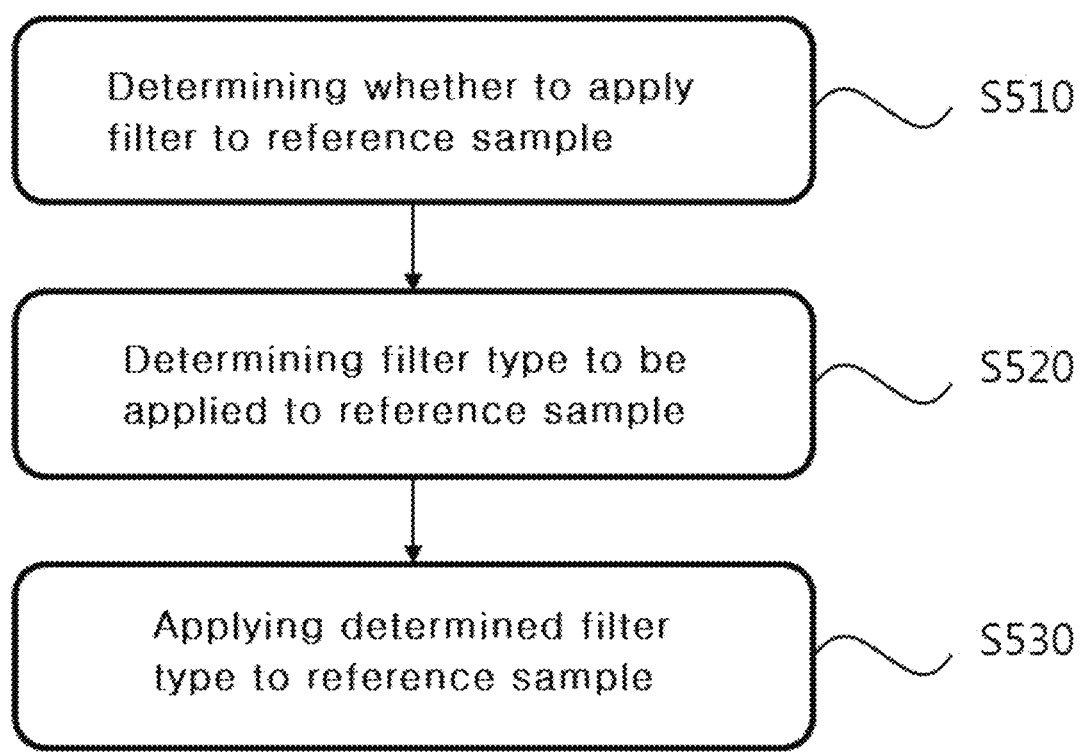
FIG. 5 is a diagram illustrating a method of applying a filter to a reference sample according to an embodiment of the present invention.

FIG. 5 is a diagram illustrating a method of applying a filter to a reference sample according to an embodiment of the present invention.

In the embodiment, for convenience, the description is given with separation between the strong filter and the weak filter, but a more subdivided filter intensity may be defined. Also, filter intensity may be determined through a predetermined computation process by the apparatus for decoding the image, or may be determined on the basis of the flag or index that identifies the filter intensity, which is signaled from the apparatus for encoding the image.

For convenience of description, in the embodiment, the pixel value of the reference sample to which the strong filter or weak filter is applied is designated by "pF", and the pixel value of the reference sample to which the filter is not applied yet is designated by "p". Accordingly, it is understood that p(x, y) indicates the pixel value of the reference sample at the position (x, y) and pF(x, y) indicates the pixel value of the reference sample at the position (x, y), to which the strong filter or the weak filter is applied.

First, whether to apply the filter to the reference sample is determined at step S510. Whether to apply the filter to the reference sample may be determined on the basis of at least one among the size of the current block and the intra prediction mode of the current block.

Figure 6:
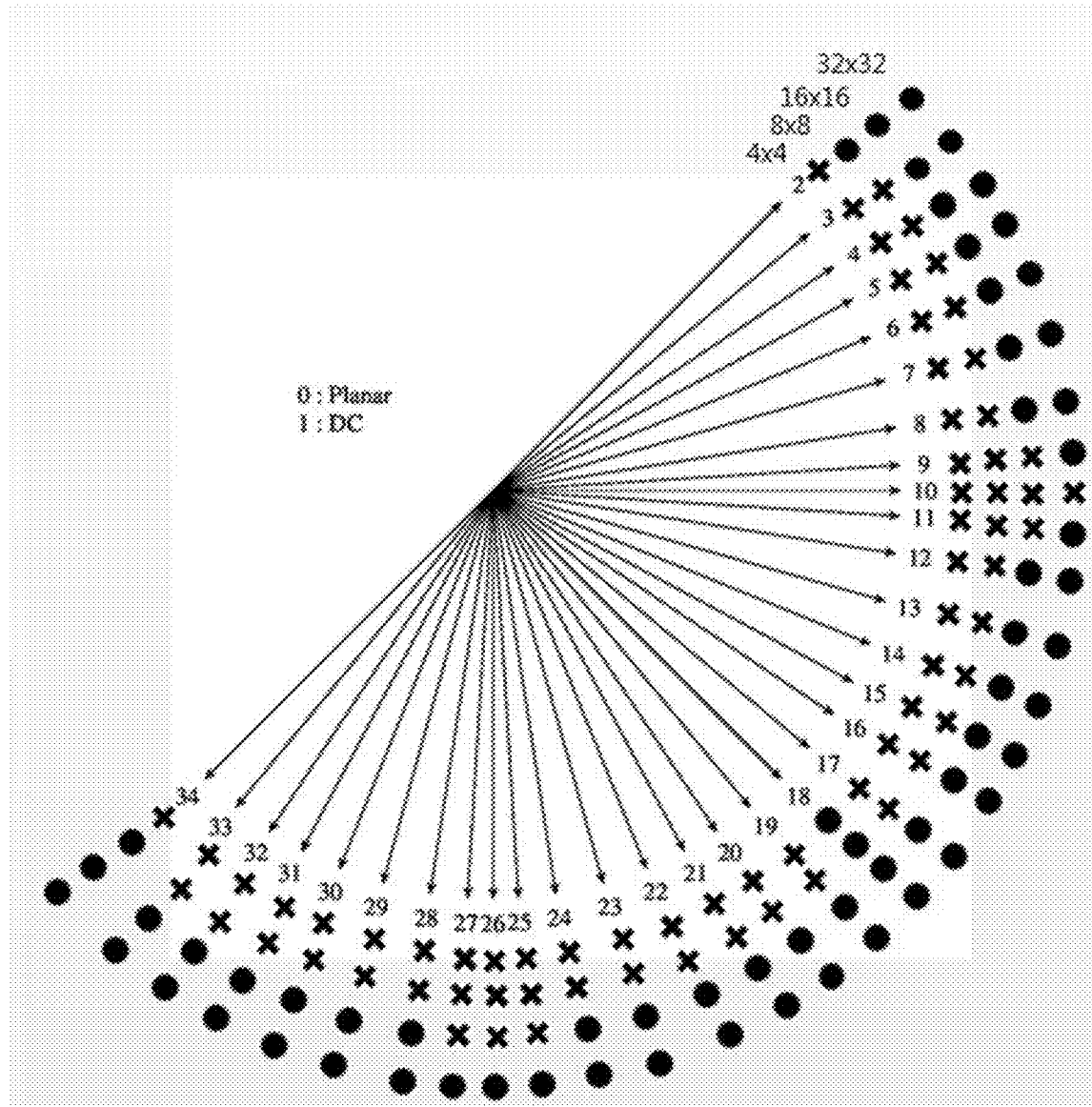
FIG. 6 is a diagram illustrating an example of whether to apply a filter according to a size of a current block and an intra prediction mode.

For example, FIG. 6 is a diagram illustrating an example of whether to apply a filter according to a size of a current block and an intra prediction mode. In the example shown in FIG. 6, the mark "O" indicates the case in which the filter is applied, and the mark "X" indicates the case in which the filter is not applied. Referring to the example shown in FIG. 6, in the case of the current block which is 4×4 in size, the filter is applied only when the intra prediction mode of the current block is the numeral "18". In the case of the current block which is 32×32 in size, the filter is applied when the intra prediction mode of the current block is the directional mode other than the numeral "10".

Figure 9:
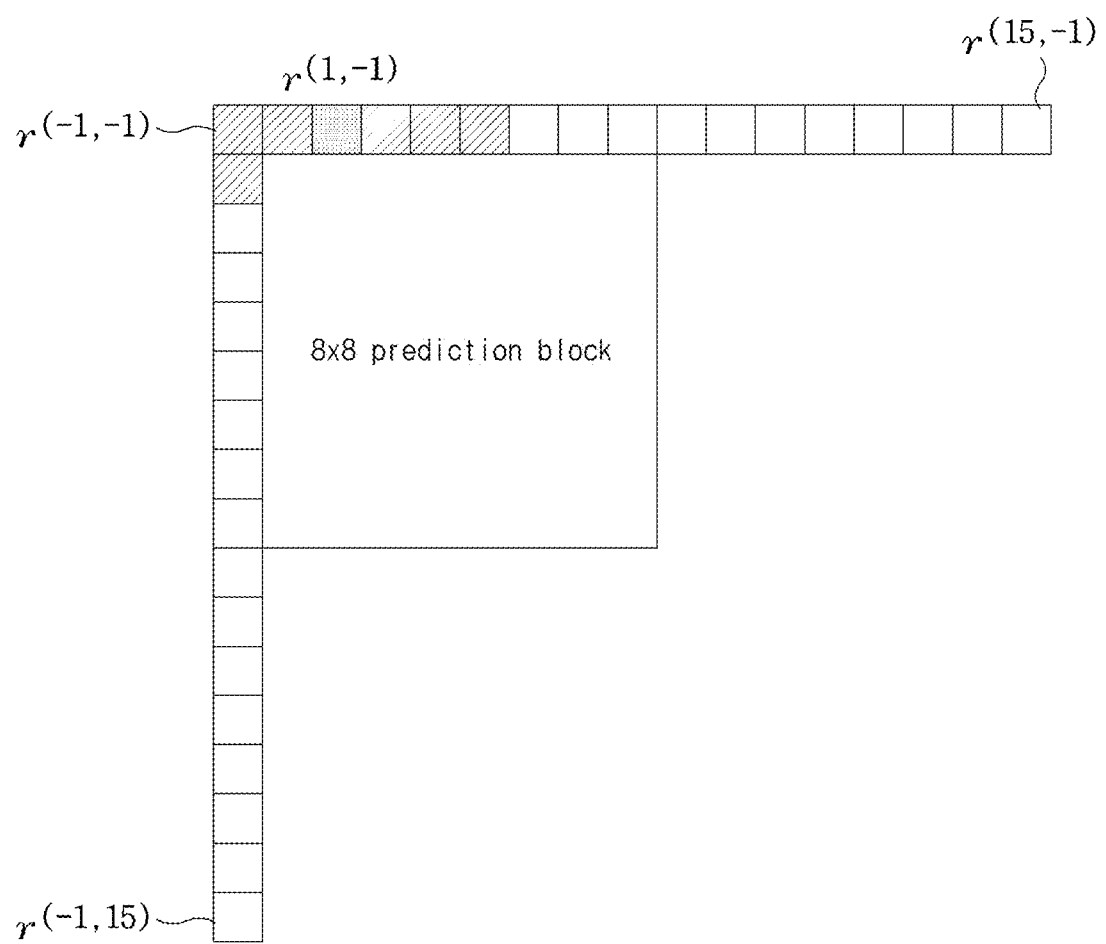
FIG. 9 is a diagram illustrating an example in which a first filter is applied to reference samples.

Whether to apply the filter according to the size and the intra prediction mode of the current block shown in FIG. 9 is only an illustrative example of the present invention, and the present is not limited thereto. Modifying the example shown in FIG. 6, when the size of the current block is equal to or smaller than a criterion value (for example, 4×4), the filter is not applied to the reference sample regardless of the intra prediction mode of the current block. When the size of the current block is equal to or larger than a criterion value (for example, 32×32), the filter is applied to the reference sample regardless of the intra prediction mode of the current block.

FIG. 6 shows an example of whether to apply the filter when the intra prediction mode of the current block is the directional mode. Also, when the intra prediction mode of the current block is the non-directional mode (particularly, a planar mode), whether to apply the filter is determined according to the size of the current block. For example, when the intra prediction mode of the current block is the planar mode and the size of the current block is equal to or greater than the criterion value, the filter is applied to the reference sample.

As another example, when the intra prediction mode of the current block is the non-directional mode (particularly, the planar mode), the filter is applied to the reference sample regardless of the size of the current block. Alternatively, when the intra prediction mode of the current block is the non-directional mode, the filter is not applied to the reference sample regardless of the size of the current block.

Whether to apply the filter to the reference sample may be determined on the basis of information (for example, a one-bit flag) signaled from the apparatus for encoding the image.

When determining that the filter is applied to the reference sample, whether to apply the strong filter or the weak filter to the reference sample is determined at step S520. Whether to apply the strong filter or the weak filter to the reference sample may be determined on the basis of the size of current block, the result of comparing the sum of two or more reference samples with the value obtained by adding or subtracting offset from the product of an integer and the reference sample at the reference position, and the like. That is, whether the strong filter is applied to the reference sample may be determined on the basis of comparison of a predetermined constant value and a variation between reference samples.

For example, Equation 1 and Equation 2 below show the application condition of the strong filter when the bit depth is eight bits.

$$|p(-1,-1)-2*p(N-1,-1)+p(2N-1,-1)|<2^3 \quad \text{[Equation 1]}$$

$$|p(-1,-1)-2*p(-1,N-1)+p(-1,2N-1)|<2^3 \quad \text{[Equation 2]}$$

In Equations 1 and 2, N denotes the size of the current block. For example, when the current block is 32×32 in size, the N has a value of 32. Equation 1 shows, with respect to the top reference sample, whether the sum of a first top reference sample $p(-1, -1)$ and the 2N−1-th top reference sample $p(2N-1, -1)$ is larger by offset $\pm 2^3$ than the product of doubling the pixel value $p(N-1, -1)$ of the N−1-th top reference sample.

Equation 2 shows, with respect to the left reference sample, whether the sum of the first left reference sample $p(-1, -1)$ and the 2N−1-th left reference sample $p(-1, 2N-1)$ is larger by offset $\pm 2^3$ than the product of doubling and the pixel value $p(-1, N-1)$ of the N−1-th left reference sample.

When Equations 1 and 2 are satisfied, the strong filter is applied to the reference sample. When at least one among Equations 1 and 2 is not satisfied, the weak filter is applied to the reference sample.

Next, the strong filter or weak filter is applied to the reference sample at step S530. For example, Equations 3 and 4 below are intended to describe an example of deriving a filtered reference sample pF by applying the strong filter and the weak filter to a reference sample p.

$$pF[-1][-1]=p[-1][-1] \quad \text{[Equation 3]}$$

$$pF[-1][y]=((63-y)*p[-1][-1]+*p[-1][63]+32>>6, \text{ for } y=0 \ldots 62$$

$$pF[-1][63]=p[-1][63]$$

$pF[x][-1]=((63-x)*p[-1][-1]+32)>>6$, for $x=0 \ldots 62$ $pF[63][-1]=p[63][-1]$ $pF[-1][-1]=(p[-1][0]+2*p[-1][-1]+p[0][-1]+2)>>2$ [Equation 4]

$pF[-1][y]=(p[-1][y+1]+2*p[-1][y][-1][y-1]+2)>>2$, for $y=0 \ldots N*2-2$ $pF[-1][N*2-1]=p[-1][N*2-1]$ $pF[x][-1]=(p[x-1][-1]+2*p[x][-1]+p[x+1][-1]+2)>>2$, for $x=0 \ldots N*2-2$ $pF[N*2-1][-1]=p[N*2-1][-1]$ On the basis of Equations 1 to 4, the example of applying the filter to the reference sample will be described.

Figure 7:
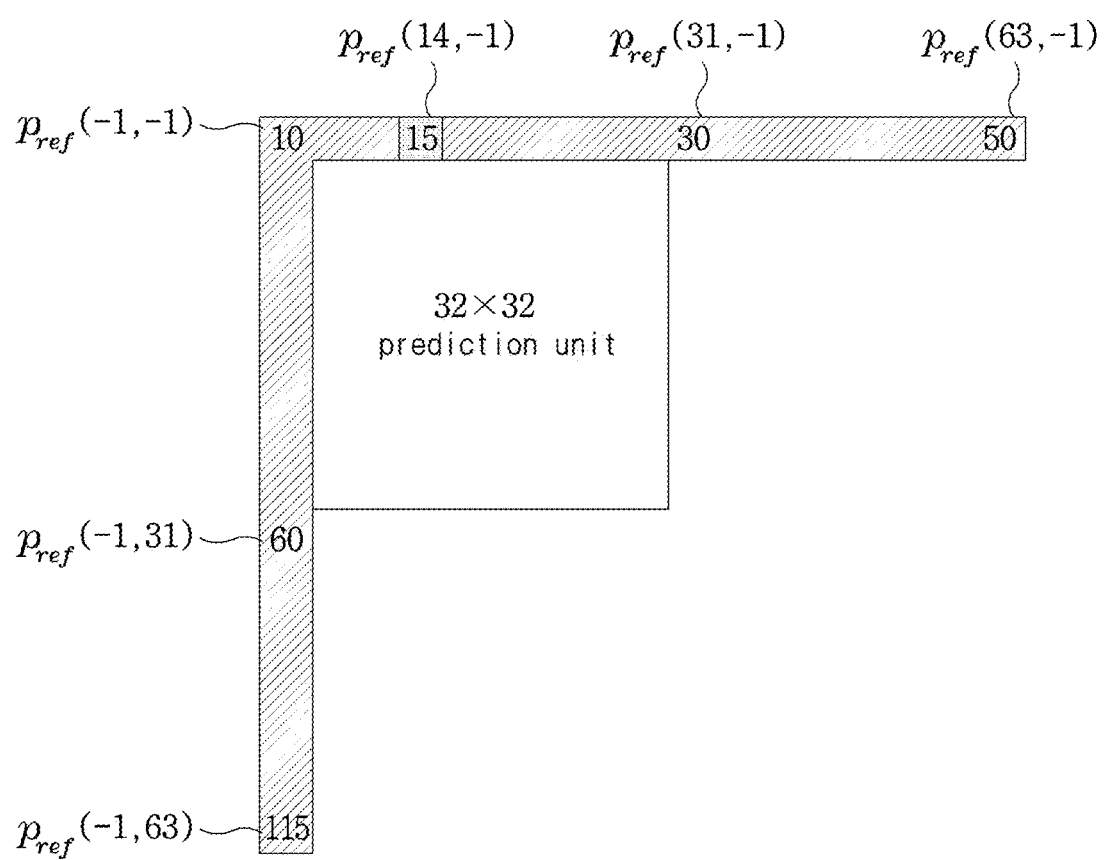
FIG. 7 is a diagram illustrating an example in which a filter is applied to reference samples.

FIG. 7 is a diagram illustrating an example in which a filter is applied to reference samples. It is assumed that the current block is a 32×32-sized prediction block (or transform block).

In FIG. 7, illustrated is that the pixel value of the top left reference pixel p(−1, −1) is 10, the pixel value of the top reference pixel p(31, −1) adjacent to the block boundary is 30, and the pixel value of the top rightmost reference pixel p(63, −1) is 50. Moreover, illustrated is that the left reference pixel p(−1, 31) adjacent to the block boundary is 60 and the pixel value of the bottom leftmost reference pixel p(−1, 63) is 115.

Putting the information in Equations 1 and 2, it is found that Equations 1 and 2 are satisfied as below.

For the top reference sample: |110−2*30+50|=0<8
For the left reference sample: |10−2*60+115|=5<8

Accordingly, the strong filter is applied to the reference sample. Assuming that the pixel value of the top reference sample at the position (14, −1) is 15, the filtered reference sample pF at the position is derived as follows.

Derivation of the filtered reference sample pF(14, −1) of the top reference sample p(14, −1): pF(14, −1)=(63−14)*10+(14+1)*50+32>>6=19

Consequently, the pixel value of the reference sample p(14, −1) may be changed from 15 to 19 after filtering.

Next, another embodiment in which the filter is applied to the reference sample will be described.

Figure 8:
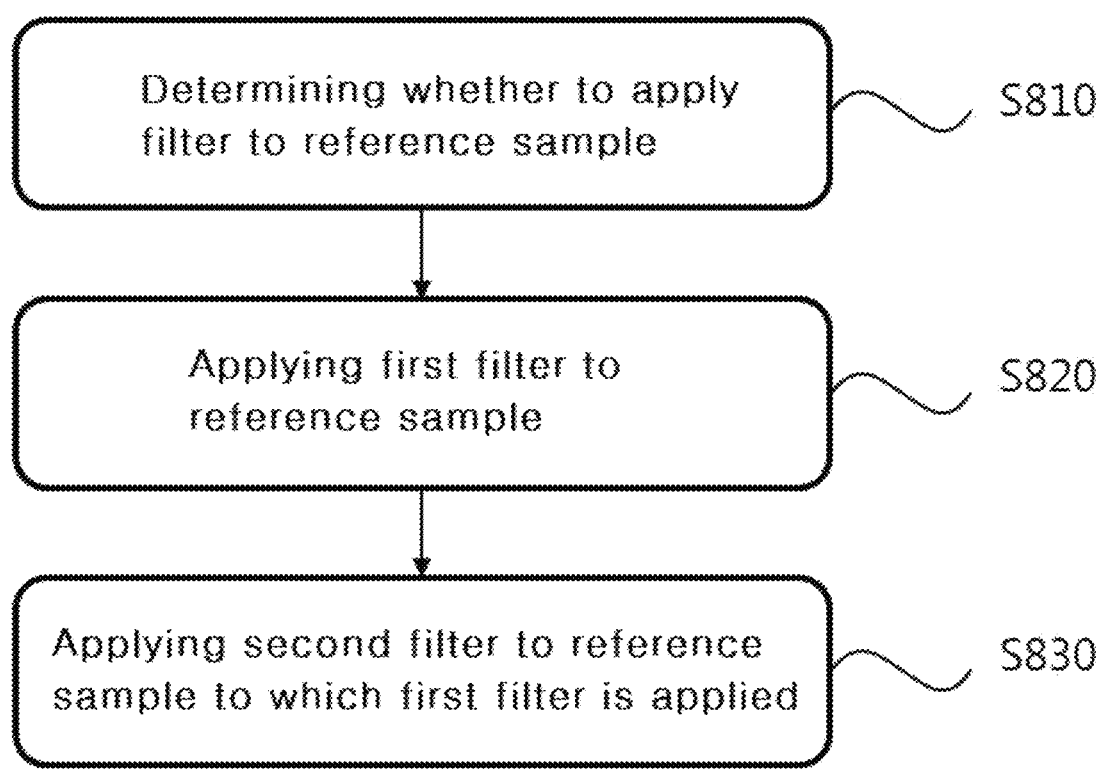
FIG. 8 is a diagram illustrating a method of applying a filter to a reference sample according to an embodiment of the present invention.

FIG. 8 is a diagram illustrating a method of applying a filter to a reference sample according to an embodiment of the present invention.

For convenience of description, in the embodiment, to be distinguished from the pixel value (designated by "r") of the reference sample to which the filter is not applied yet, the pixel value of the reference sample to which the filter is applied is referred to as a first pixel value (designated by "m") or a second pixel value (designated by "n"). Here, the first pixel value indicates the pixel value of the reference sample to which the first filter is applied, and the second pixel value indicates the pixel value of the reference sample to which the second filter is applied. Accordingly, it is understood that r(x, y) indicates the pixel value of the reference sample at the position (x, y), m(x, y) indicates the pixel value of the reference sample at the position (x, y) to which the first filter is applied, and n(x, y) indicates the pixel value of the reference sample at the position (x, y) to which the second filter is applied.

First, whether to apply the filter to the reference sample is determined at step S810. Whether to apply the filter to the reference sample may be determined on the basis of at least one among the size of the current block and the intra prediction mode of the current block.

For example, the above-described embodiment with reference to FIG. 6 may be intactly applied in determining whether the first or second filter is applied to the reference sample.

When determining that the filter is applied to the reference sample, first, the first filter is applied to the reference sample at step S820.

Here, the length of the first filter being applied to the reference sample may be a fixed value regardless of the size of the current block or the intra prediction mode of the current block.

As another example, the length of the first filter may be determined according to at least one among the size of the current block, the intra prediction mode of the current block, and the position of the reference sample. For example, Table 1 shows the length of the first filter according to the intra prediction mode.

TABLE 1

| Intra Prediction Mode | Planar | DC | 2-11 | 12-13 | 14-22 | 23-24 | 25-34 |
|---|---|---|---|---|---|---|---|
| Filter | 7-tap | None | 7-tap | 5-tap | 7-tap | 5-tap | 7-tap |

Table 1 shows that the first filter is applied except the case in which the intra prediction mode of the current block is the DC mode. Moreover, shown is that the length of the first filter is a length of five taps or seven taps according to the intra prediction mode.

According to the size of the current block, the length of the filter or the filter coefficient may vary. For example, when the current block is in a second size, which is larger than a first size, the number of taps for the first filter is a larger value than when the current block in in the first size. For example, if Table 1 shows the length of the first filter according to the intra prediction mode in the case of the current block being 8×8 in size, when the current block is 16×16 or 32×32 in size, the length of the first filter is a longer value than 7-tap or 5-tap shown in Table 1. Accordingly, the larger size the prediction block is in, the larger smoothing the pixel value r of the reference sample is subjected to. The smaller size the prediction block is in, the smaller smoothing the pixel value r of the reference sample is subjected to.

The first filter may operate on the basis of a reference sample and reference samples adjacent to the reference sample. When the length of the first filter is an odd number N, the reference sample, (N−1)/2 samples adjacent to the left (or the bottom) of the reference sample, and (N−1)/2 reference samples adjacent to the right (or the top) of the reference sample are used in filtering (convolution) of the reference sample.

For example, FIG. 9 is a diagram illustrating an example in which the first filter is applied to the reference samples. For convenience of description, it is assumed that the current block is a 8×8-sized prediction block and the intra prediction mode of the current block is the numeral 10 (the horizontal direction).

Referring to Table 1 above, when the current block is 8×8 in size and the intra prediction mode of the current block is the numeral 10, the first filter has a length of seven taps. Accordingly, three reference samples positioned on the left (or the bottom) of the reference sample and three reference samples positioned on the right (or the top) may be used in filtering the reference sample.

FIG. 9 illustrates an example in which the first filter is applied to the reference samples positioned on the top of the current block. For example, the filtered reference sample m(1, −1) at the position (1, −1) may be obtained by applying the first filter to the reference sample r(1, −1), the three reference samples positioned on the left of the reference sample r(1, −1), and the three reference samples positioned on the right of the reference sample r(1, −1).

Here, when there is no sufficient number of reference samples on the left of the reference sample to which the first filter is desired to be applied, a reference sample close to the left of the current block is used. For example, as the example shown in FIG. 9, only two reference samples are present on the left of the reference sample r(1, −1), so that two reference samples (namely, r(0, −1) and r(−1, −1)) positioned on the left of the reference sample r(1, −1) and one reference sample (namely, r(−1, 1)) close to the left of the current block are used in filtering the reference sample r(1, −1).

Although not shown, in filtering the reference sample r(0, −1), one reference sample (namely, r(−1, −1)) positioned on the left of the reference sample r(0, −1) and two reference samples (namely, r(−1, 1) and r(−1, 2)) close to the left of the current block may be used.

As another example, when the x coordinate of the reference sample positioned on the left of the reference sample is smaller than −1, the filter coefficient to be applied to the relevant reference sample is zero. Also, when the x coordinate of the reference sample positioned on the right of the reference sample is larger than 2N−1 (here, N denotes the size of the current block), the filter coefficient to be applied to the relevant reference sample is zero.

In the case of the left reference sample positioned on the left of the current block, filtering may be performed using the reference sample positioned on the top of the reference sample and the reference sample positioned on the bottom of the reference sample.

Here, when there is no sufficient number of reference samples on the top of the reference sample, the reference sample close to the top of the current block is used in filtering the reference sample close to the left of the current block. For example, only two reference samples are preset on the top of the reference sample r(−1, 1), so that two reference samples (namely, r(−1, 0) and r(−1, −1)) positioned on the top of the reference sample r(−1, 1) and one reference sample (namely, r(1, −1)) close to the top of the current block are used in deriving the filtered reference sample m(−1, 1).

As another example, when the y coordinate of the reference sample positioned on the top of the reference sample is smaller than −1, the filter coefficient to be applied to the relevant reference sample is zero. Also, when the y coordinate of the reference sample positioned on the bottom of the reference sample is larger than 2N−1 (here, N denotes the height of the current block), the filter coefficient to be applied to the relevant reference sample is zero.

The coefficients of the first filter may be fixed values. As another example, the coefficients of the first filter may be variables varying according to at least one among the size, the intra prediction mode of the current block, and the position of the reference sample.

For example, when the intra prediction mode of the current block is the numeral 10, the coefficients of the first filter are {1/64, 6/64, 15/64, 20/64, 15/64, 6/64, 1/64}.

Accordingly, the first pixel value m(1, −1) of the reference sample r(1, −1) shown in FIG. 9 may be derived according to Equation 5 below.

$$m(1, -1) = \frac{1}{64}*r(-1, 0) + \frac{6}{64}*r(0, -1) + \frac{20}{64}*r(1, -1) + \\ \frac{15}{64}*r(2, -1) + \frac{6}{64}*r(3, -1) + \frac{1}{64}*r(4, -1)$$ [Equation 5]

Referring to Equation 5, the closer the reference sample is positioned to the filter application target reference sample, the larger the filter coefficient is. For example, Equation 1 shows that the filter coefficient of 20/64 is applied to the reference sample r(1, −1), the filter coefficient of 15/64 is applied to the reference samples r(0, −1) and r(2, −1) that are spaced apart from the reference sample r(1, −1) by one, and the filter coefficient of 6/64 is applied to the reference samples r(−1, −1) and r(3, −1) that are spaced apart from the reference sample r(1, −1) by two.

The filter coefficient used in filtering the reference sample r(x, y) may be up-scaled in order to reduce calculation complexity and enhance calculation accuracy of a processor for calculating the first pixel value m(x, y). When the sum of filter coefficients is up-scaled to be 2n (here, n=2, 3, 4, . . . ), the first pixel value m(x, y) is obtained by reconstructing the scaled computation value into the original bit depth through right shift computation.

Next, the second filter may be applied to the reference sample to which the first filter has been applied at step S830. Here, whether to apply the second filter may be determined on the basis of the size of the current block, the intra prediction mode of the current block, and the like.

The second filter may use bi-linear transform (bi-linear interpolation) using the pixel value r of the reference sample to which the filter is not applied yet and the pixel value m of the reference sample to which the first filter is applied. Specifically, by taking the size and the prediction direction of the current block into consideration, the weighting value to be applied to the reference sample r, to which the filter is not applied yet, and the weighting value to be applied to the reference sample m, to which the first filter is applied, are determined, and on the basis of the determined weighting values, the reference sample n to which the second filter is applied is derived. For example, Equation 6 below shows an example of obtaining the reference sample n to which the second filter is applied.

$$n(x,y)=\omega*r(x,y)+(1-\omega)*m(x,y), 0\leq\omega\leq 1$$ [Equation 6]

In Equation 6, ω denotes the weighting value and is a value ranging 0 to 1. According to the weighting value ω, it is possible to determine the weighting value to be applied to the reference sample to which the filter is not applied yet and the weighting value to be applied to the reference sample to which the first filter is applied. For example, Equation 6 shows that the weighting value ω is applied to the reference sample to which the filter is not applied yet and the weighting value 1−ω is applied to the reference sample to which the first filter is applied. Accordingly, when the weighting value is zero, the second pixel value n(x, y) is equal to the first pixel value m(x, y). When the weighting value is one, the second pixel value n(x, y) is equal to the pixel value r(x, y) of the reference sample to which the filter is not applied yet.

The weighting value ω may be a fixed constant or a variable varying according to the size of the current block and the intra prediction mode of the current block.

For example, as the size of the current block decreases, the weighting value ω increases. For example, the weighting value ω for the current block being 8×8 in size may be larger than the weighting value ω for the current block being 16×16 or 32×32 in size.

The weighting value ω may vary according to the intra prediction mode of the current block. For example, the weighting value ω for the case in which the intra prediction mode of the current block is the vertical mode or horizontal mode may be larger than the weighting value ω for the case in which the intra prediction mode of the current block is the directional mode other than the vertical or horizontal mode.

For example, when the current block is 8×8 in size and the intra prediction mode of the current block is the numeral "10" (namely, the horizontal direction), assuming that the weighting value ω is a value of 47/64, the second pixel value n is derived as follows.

$$n(x, y) = \frac{47}{64} * r(x, y) + \frac{17}{64} * m(x, y)$$

As another example, when the current block is 4×4 in size and the intra prediction mode of the current block is the numeral "10", assuming that the weighting value ω is a value of 56/64, the second pixel value n is derived as follows.

$$n(x, y) = \frac{56}{64} * r(x, y) + \frac{8}{64} * m(x, y)$$

In order to reduce complexity (namely, reduce floating point computation) and enhance calculation accuracy of a processor performing bi-linear transform related to the second filter, the weighting value ω may be an integer obtained through up-scaling. In this case, the bi-linear transformed value is reconstructed into the original bit depth on the basis of right shift computation, so that the second pixel value n(x, y) is obtained.

Next, an embodiment in which the prediction sample is derived using the reference sample to which the filter is applied will be described.

Figure 10:
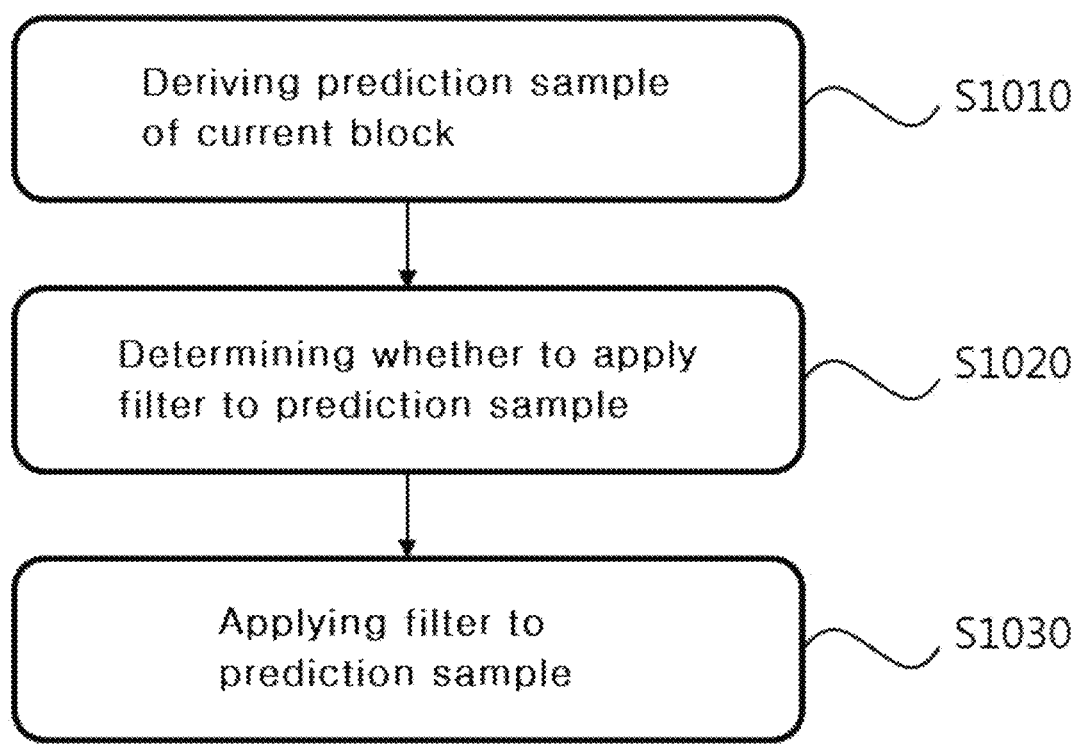
FIG. 10 is a diagram illustrating a method of obtaining a prediction sample according to an embodiment of the present invention.

FIG. 10 is a diagram illustrating a method of obtaining a prediction sample according to an embodiment of the present invention.

First, using the prediction direction of the current block and the reference sample, the prediction sample of the current block may be obtained at step S1010. Here, the reference sample may correspond to the reference sample n or p to which the filter is not applied yet, the reference sample pF to which the strong filter or weak filter is applied, which is described with reference to FIG. 5, the reference sample m to which the first filter is applied, or the reference sample n to which both the first filter and the second filter are applied.

For convenience of description, in the embodiment, it is assumed that the prediction sample is derived using the reference sample n to which both the first filter and the second filter are applied. Moreover, "q" denotes the prediction sample derived according to the reference sample n to which the filter is applied, and "p" denotes the pixel value obtained by applying the filter to the prediction sample. Accordingly, it is understood that q(x, y) corresponds to the pixel value of the prediction sample corresponding to the position (x, y) and p(x, y) corresponds to the pixel value obtained by applying the filter to the prediction sample at the position (x, y).

Figure 11:
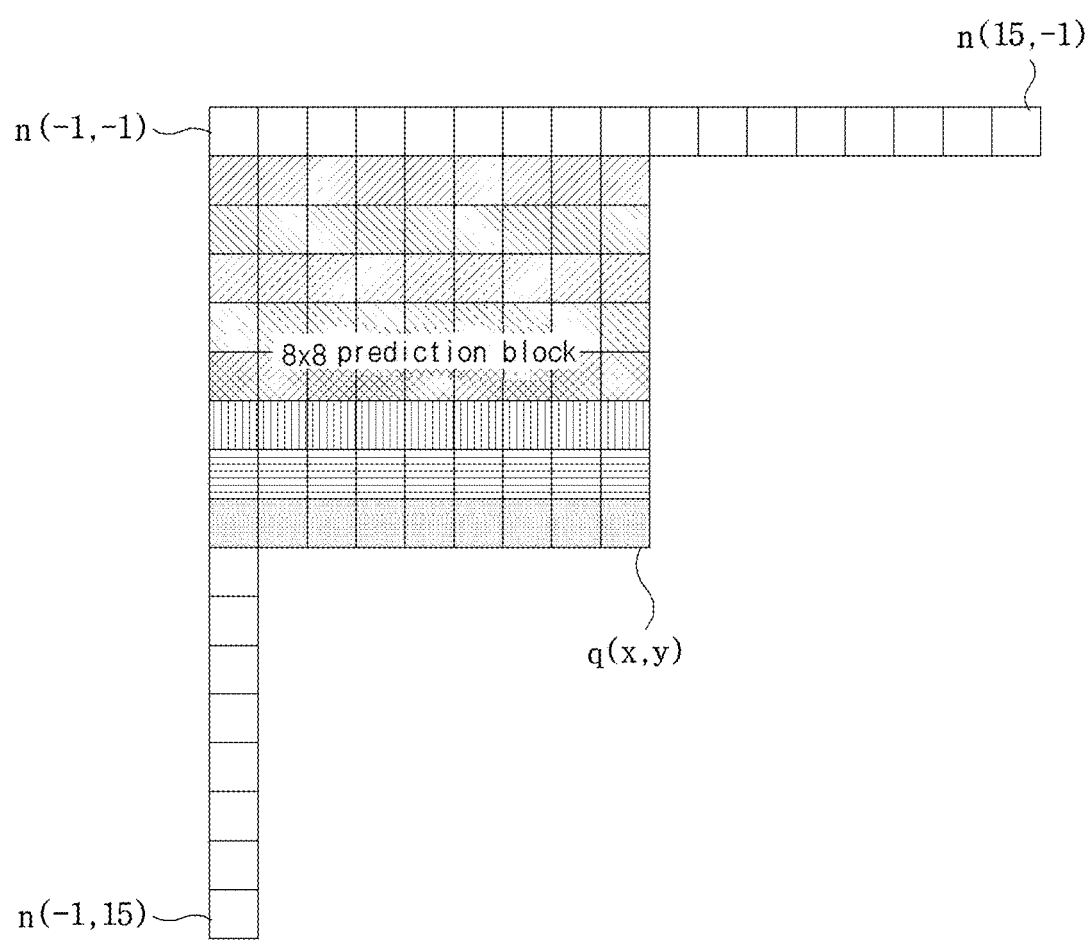
FIG. 11 is a diagram illustrating an example of deriving a prediction sample on the basis of a filtered reference sample.

According to the intra prediction mode of the current block, the prediction sample q may be derived on the basis of the reference sample n to which at least one filter is applied. For example, FIG. 11 is a diagram illustrating an example of deriving a prediction sample on the basis of a filtered reference sample.

It is assumed that the current block is an 8×8-sized prediction block (or transform block). When the prediction mode of the current block is the numeral "10" (namely, the horizontal direction), the prediction sample q is derived on the basis of the left reference sample adjacent to the left of the current block. For example, the prediction sample q(x, y) positioned at the coordinates (x, y) may have the same value as the reference sample n (−1, y) at the position (−1, y) to which the filter is applied. In summary, the prediction sample $q(x, y_0)$ for a specific $y_0$ may be obtained as follows.

$$q(x,y_0)=n(-1,y_0), 0 \leq x \leq 8$$

Although not shown, when the prediction mode of the current block in the numeral 26 (namely, the vertical direction), the prediction sample $q(x_0, y)$ for a specific $x_0$ has the same value as the top reference sample $n(x_0, y)$ to which the filter is applied.

Moreover, when the prediction mode of the current block is the directional mode other than the vertical or horizontal direction, the prediction sample q is derived as a value between two or more reference samples to which the filter is applied.

When the reference sample is used to predict the pixel value of the current block (namely, the value of the prediction sample), due to the characteristics of the intra prediction mode, a correlation between the prediction sample and the reference sample varies according to the distance (or position) between the prediction sample and the reference sample.

As a specific example, when the intra prediction mode of the current block is the DC mode, the value of the prediction sample is derived from the average value of reference samples. When the intra prediction mode is the directional mode, the value of the reference sample is derived as the value of the prediction sample according to directionality. The pixel value of the prediction sample close to the reference sample is likely to be similar to the pixel value of the actual sample, but the pixel value of the prediction sample spaced away from the reference sample is unlikely to be similar to the pixel value of the actual sample.

Therefore, by taking the correlation between the reference sample and the prediction sample into consideration, whether to apply the filter to the prediction sample is determined at step S1020. Whether to apply the filter to the prediction sample may be determined on the basis of the size of the current block, the division depth of the current block, the division shape of the current block, the intra prediction mode of the current block, and the like.

As another example, whether to apply the filter to the prediction sample may be determined on the basis of information (for example, a one-bit flag) signaled from the apparatus for encoding the image.

When determining that the filter is applied to the prediction sample, the filter is applied to the prediction sample on the basis of the prediction sample and the reference sample to which the filter is not applied yet at step S1030. Here, the filter based on bi-linear transform (bi-linear interpolation) using the pixel value r of the reference sample to which the filter is not applied yet and the pixel value q of the prediction sample may be applied to the prediction sample. Specifically, by taking the size and the prediction direction of the current block into consideration, the weighting value to be applied to the reference sample to which the filter is not applied yet and the weighting value to be applied to the prediction sample may be determined, and on the basis of the determined weighting values, the prediction sample p to which the filter is applied may be derived. For example, Equation 7 below shows an example of obtaining the prediction sample p to which the filter is applied.

$$p(x,y)=\alpha*r(x_0,y_0)+(1-\alpha)*q(x,y) \quad \text{[Equation 7]}$$

In Equation 7, $r(x_0, y_0)$ may include at least one among the reference sample positioned on the top of the current block and the reference sample positioned on the left of the current block. For example, $r(x_0, y_0)$ may indicate the reference sample $r(-1, y)$ positioned on the same horizontal line as the prediction sample $q(x, y)$ or the reference sample $r(x, -1)$ positioned on the same vertical line as the prediction sample $q(x, y)$.

Moreover, in Equation 7, $\alpha$ denotes the weighting value and is a value ranging 0 to 1. According to the weighting value $\alpha$, it is possible to determine the weighting value to be applied to the reference sample r to which the filter is not applied yet and the weighting value to be applied to the prediction sample q. For example, Equation 7 shows that the weighting value $\alpha$ is applied to the reference sample to which the filter is not applied yet and the weighting value $1-\alpha$ is applied to the prediction sample. Accordingly, when the weighting value is zero, the pixel value $p(x, y)$ of the prediction sample to which the filter is applied is equal to the pixel value $q(x, y)$ of the prediction sample. When the weighting value is one, the pixel value $p(x, y)$ of the prediction sample to which the filter is applied is equal to the pixel value $r(x, y)$ of the reference sample to which the filter is not applied yet.

The weighting value $\alpha$ may be a fixed constant or a variable varying according to the size of the current block, the intra prediction mode of the current block, and the position of the prediction sample. For example, the closer the prediction sample is positioned to the reference sample, the larger the weighting value $\alpha$ is. The farther the prediction sample is positioned away from the reference sample, the smaller the weighting value $\alpha$ is. This is to correct, for the prediction sample having a high spatial correlation with the reference sample, the prediction sample by applying the pixel value of the reference sample in a strong manner, and to correct, for the prediction sample having a low spatial correlation with the reference sample, the prediction sample by applying the pixel value of the reference sample in a weak manner.

According to at least one among the size and the prediction direction of the current block, the weighting value $\alpha$ may be obtained using at least one among at least one top reference sample positioned on the top of the current block and at least one left reference sample positioned on the left of the current block.

For example, the weighting value $\alpha$ for the prediction sample $q(x, y)$ may be obtained according to Equation 8 below.

$$\alpha=[\beta*r(-1,y)]+[\gamma/r(x,-1)] \quad \text{[Equation 8]}$$

In Equation 8, $\beta$ and $\gamma$ may be determined on the basis of the distance between the prediction sample and the reference sample. The closer the prediction sample is positioned to the reference sample, the larger the $\beta$ and $\gamma$ have values.

Equation 8 shows that the weighting value $\alpha$ is derived on the basis of one reference sample $r(x, -1)$ positioned on the top of the current block and one reference sample $r(y, -1)$ positioned on the left of the current block. Unlike the example, according to the intra prediction mode of the current block, the weighting value $\alpha$ may be derived only using the reference sample positioned on the top of the current block, or the weighting value $\alpha$ may be derived only using the reference sample positioned on the left of the current block.

Moreover, according to the intra prediction mode of the current block, two or more top reference samples and two or more left reference samples may be used in deriving the weighting value $\alpha$. For example, Equation 9 shows an example of deriving the weighting value $\alpha$ by using two or more top reference samples and two or more left reference samples.

$$\alpha=[\beta*r(-1,y)-\beta'*r(-1,y+y')]+[\gamma*r(x,-1)-\gamma'*r(x+x',-1)]$$

In Equation 9, $\beta$, $\beta'$, $\gamma$, and $\gamma'$ may be determined on the basis of the distance between the prediction sample and the reference sample. The shorter the distance between the prediction sample and the reference sample is, the larger values $\beta$, $\beta'$, $\gamma$, and $\gamma'$ have. Moreover, in Equation 9, x' and y' may be determined according to the intra prediction direction of the current block.

Equations 8 and 9 show that in deriving the weighting value $\alpha$, the reference sample (namely, $r(x, -1)$) having the same x coordinate as the prediction sample and the reference sample (namely, $r(-1, y)$) having the same y coordinate as the prediction sample are used. However, according to the size and the intra prediction mode of the current block or the position of the prediction sample, the weighting value $\alpha$ may be derived only using the reference sample (namely, $r(x+x', -1)$, $r(-1, y+y')$, or the like) at the position other than the reference sample (namely, $r(x, -1)$) having the same x coordinate as the prediction sample and the reference sample (namely, $r(-1, y)$) having the same y coordinate as the prediction sample.

Figure 12:
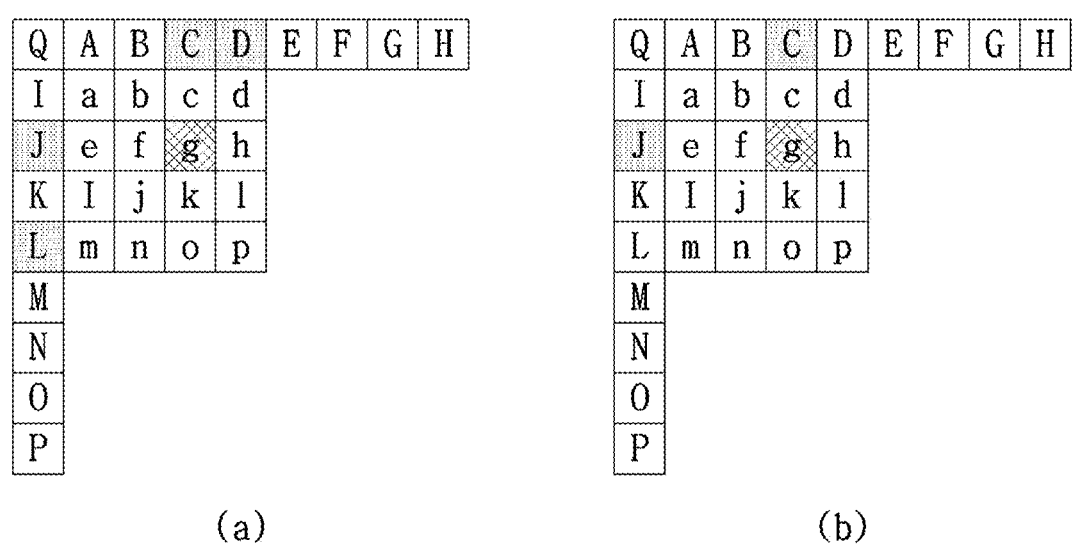

FIG. 12 is a diagram illustrating an example of deriving a weighting value used in applying a filter to a prediction sample. For convenience of description, it is assumed that the current block is a 4×4-sized prediction block (or transform block). Moreover, it is assumed that the small letter indicates the prediction sample q and the capital letter indicates the reference sample r to which the filter is not applied yet.

When the intra prediction mode of the current block is the numeral "10" (namely, the horizontal direction), the weighting value $\alpha$ for the prediction sample "g" with coordinates (2, 1) is derived on the basis of the reference sample to which the filter is not applied yet, which is close to the current block.

For example, as the example shown in FIG. 12(a), the weighting value $\alpha$ for the prediction sample "g" may be derived using the reference sample J positioned on the same horizontal line as the prediction sample and the reference sample C positioned on the same vertical line as the prediction sample. For example, the weighting value $\alpha$ may be derived as follows.

$$\alpha = \left[\frac{32}{64}\bigg/2*J\right] + \left[\frac{40}{64}\bigg/1*C\right]$$

As another example, the weighting value α for the prediction sample "g" may be derived using two or more top reference samples and two or more left reference samples. For example, the weighting value α may be derived as follows.

$$\alpha = \left[\frac{32}{64} \bigg/ 2*J - \frac{0}{64} \bigg/ 2*L\right] + \left[\frac{40}{64} \bigg/ 1*C - \frac{32}{64} \bigg/ 1*D\right]$$

When the weighting value α is derived, the weighting value α is applied to the reference sample r to which the filter is not applied yet, and the weighting value 1−α is applied to the prediction sample q, thereby obtaining a new prediction sample p.

The weighting value α is a decimal between zero and one and includes floating point computation. In order to reduce complexity and enhance calculation accuracy with respect to floating point computation by the processor, the weighting value α may be up-scaled. In this case, the bi-linear transformed value to which the weighting value α is applied is reconstructed into the original bit depth on the basis of right shift computation, so that the prediction sample p(x, y) to which the filter is applied is obtained.

In FIGS. 10 to 12, illustrated is that the filter based on the prediction sample and the reference sample to which the filter is not applied yet is applied to the prediction sample.

As another example, the filter based on the prediction sample and the reference sample to which the filter is applied may be applied to the prediction sample. Here, the reference sample to which the filter is applied may correspond to, as described above with reference to FIGS. 5 to 9, the reference sample to which the strong filter or weak filter is applied, the reference sample to which the first filter is applied, or the reference sample to which the second filter is applied.

The components described in the exemplary embodiments of the present invention may be achieved by at least one of a digital signal processor (DSP), a processor, a controller, an application specific integrated circuit (ASIC), a programmable logic element such as a field programmable gate array (FPGA), other electronic devices, and combinations thereof.

Alternatively, at least one of the functions or the processes described in the exemplary embodiments of the present invention may be achieved by software, and the software may be recorded on a recording medium. Examples of the computer-readable storage medium include magnetic recording media such as hard disks, floppy disks and magnetic tapes; optical data storage media such as CD-ROMs or DVD-ROMs; magneto-optical media such as floptical disks; and hardware devices, such as read-only memory (ROM), random-access memory (RAM), and flash memory, which are particularly structured to store and implement the program instruction. Examples of the program instructions include not only a mechanical language code formatted by a compiler but also a high level language code that may be implemented by a computer using an interpreter, and the like. The hardware devices may be configured to be operated by one or more software modules or vice versa to conduct the processes according to the present invention. Components, functions, processes, and the like according to the embodiments of the present invention may be implemented in the form of a combination of hardware and software.

Although the invention is described with reference to specific items such as specific structural elements, to merely some embodiments, and to drawings, such specific details disclosed herein are only representative for purposes of helping more comprehensive understanding of the present invention. The present invention, however, is not limited to only the example embodiments set forth herein, and those skilled in the art will appreciate that the present invention can be embodied in many alternate forms.

Accordingly, the present invention is intended to cover not only the exemplary embodiments, but also various alternatives, modifications, equivalents and other embodiments that may be included within the spirit and scope of the present invention as defined by the appended claims.

INDUSTRIAL APPLICABILITY

The present invention is applicable to an electronic device capable of encoding/decoding an image.

The invention claimed is:

1. A video signal encoding method comprising:
   determining an intra prediction mode of a current block;
   obtaining a reference sample based on a neighboring sample of the current block;
   obtaining a first prediction sample of the current block based on the reference sample and the intra prediction mode;
   obtaining a second prediction sample of the current block by performing weighted filtering based on the reference sample and the first prediction sample; and
   obtaining a reconstructed sample of the current block based on the second prediction sample,
   wherein whether to performing the weighted filtering is determined based on the intra prediction mode,
   wherein the obtaining the reference sample comprises filtering the neighboring sample of the current block, and
   wherein whether to filter the neighboring sample of the current block is determined based on a width and a height of the current block.

2. A non-transitory computer-readable recording medium storing a bitstream which is generated by a video signal encoding method, the method comprising:
   determining an intra prediction mode of a current block;
   obtaining a reference sample based on a neighboring sample of the current block;
   obtaining a first prediction sample of the current block based on the reference sample and the intra prediction mode;
   obtaining a second prediction sample of the current block by performing weighted filtering based on the reference sample and the first prediction sample; and
   obtaining a reconstructed sample of the current block based on the second prediction sample,
   wherein whether to performing the weighted filtering is determined based on the intra prediction mode,
   wherein the obtaining the reference sample comprises filtering the neighboring sample of the current block, and
   wherein whether to filter the neighboring sample of the current block is determined based on a width and a height of the current block.

3. A video signal decoding method comprising:
   determining an intra prediction mode of a current block;
   obtaining a reference sample based on a neighboring sample of the current block;
   obtaining a first prediction sample of the current block based on the reference sample and the intra prediction mode;

obtaining a second prediction sample of the current block by performing weighted filtering based on the reference sample and the first prediction sample;

obtaining a reconstructed sample of the current block based on the second prediction sample; and filtering the reconstructed sample of the current block, wherein whether to performing the weighted filtering is determined based on the intra prediction mode, wherein the obtaining the reference sample comprises filtering the neighboring sample of the current block, and wherein whether to filter the neighboring sample of the current block is determined based on a width and a height of the current block.

* * * * *